United States Patent [19]

Massa

[11] 3,855,571
[45] Dec. 17, 1974

[54] AIRCRAFT GROUND TRAFFIC CONTROL SYSTEM

[75] Inventor: Frank Massa, Cohasset, Mass.

[73] Assignee: Massa Corporation, Hingham, Mass.

[22] Filed: Apr. 13, 1972

[21] Appl. No.: 243,656

[52] U.S. Cl. .............................................. 340/26
[51] Int. Cl. ............................................ G08g 5/00
[58] Field of Search .......... 340/22, 23, 24, 26, 38 S, 340/32

[56] References Cited
UNITED STATES PATENTS

| | | | |
|---|---|---|---|
| 3,209,313 | 9/1965 | Auer, Jr. et al. | 340/38 S |
| 3,281,779 | 10/1966 | Yeiser | 340/23 |
| 3,568,161 | 3/1971 | Knickel | 340/24 |
| 3,706,969 | 12/1972 | Paredes | 340/26 |

OTHER PUBLICATIONS

Barber; 21 Ways to Pick Data Off Moving Objects, Control Engineering, Oct., 1963, pp. 82–86, Jan., 1964, pp. 61–64.

*Primary Examiner*—Ralph D. Blakeslee

[57] ABSTRACT

Mounted on each airplane is a small waterproof loudspeaker that transmits a coded high frequency acoustic signal while the airplane is on the ground. A plurality of microphones are located along the runways, taxiing strips, ramps, and gate positions. The acoustic signals will propagate a limited distance so that only a near-by microphone will be activated thereby, thus making it very simple to continuously monitor the positions of airplanes on the ground. Each microphone is separately connected to a recognition circuit which in turn activates a corresponding display indicator. The indicators are arranged on a display panel in the form of a map of the airfield.

6 Claims, 3 Drawing Figures

AIRCRAFT POSITION DISPLAY WALL PANEL

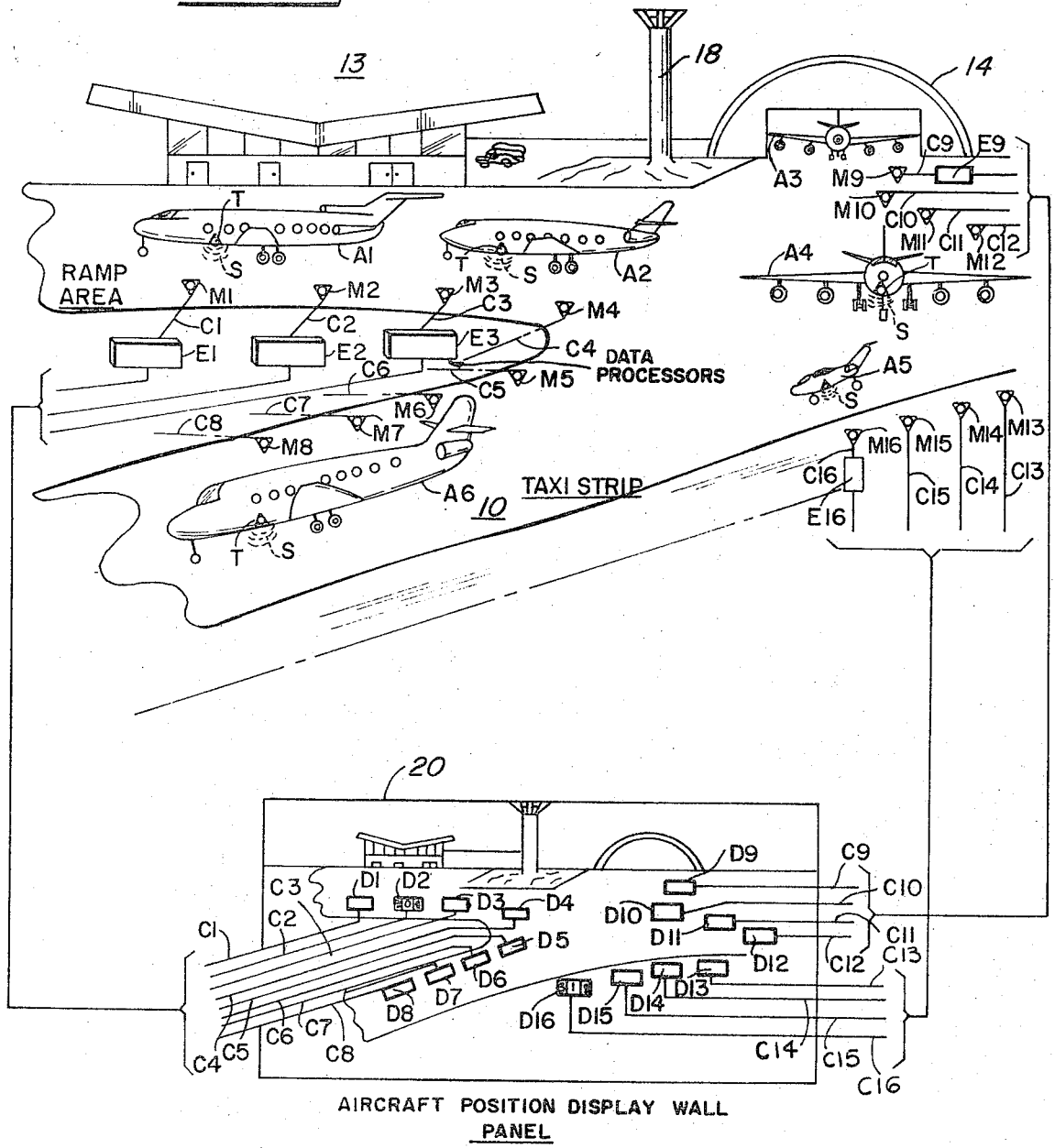

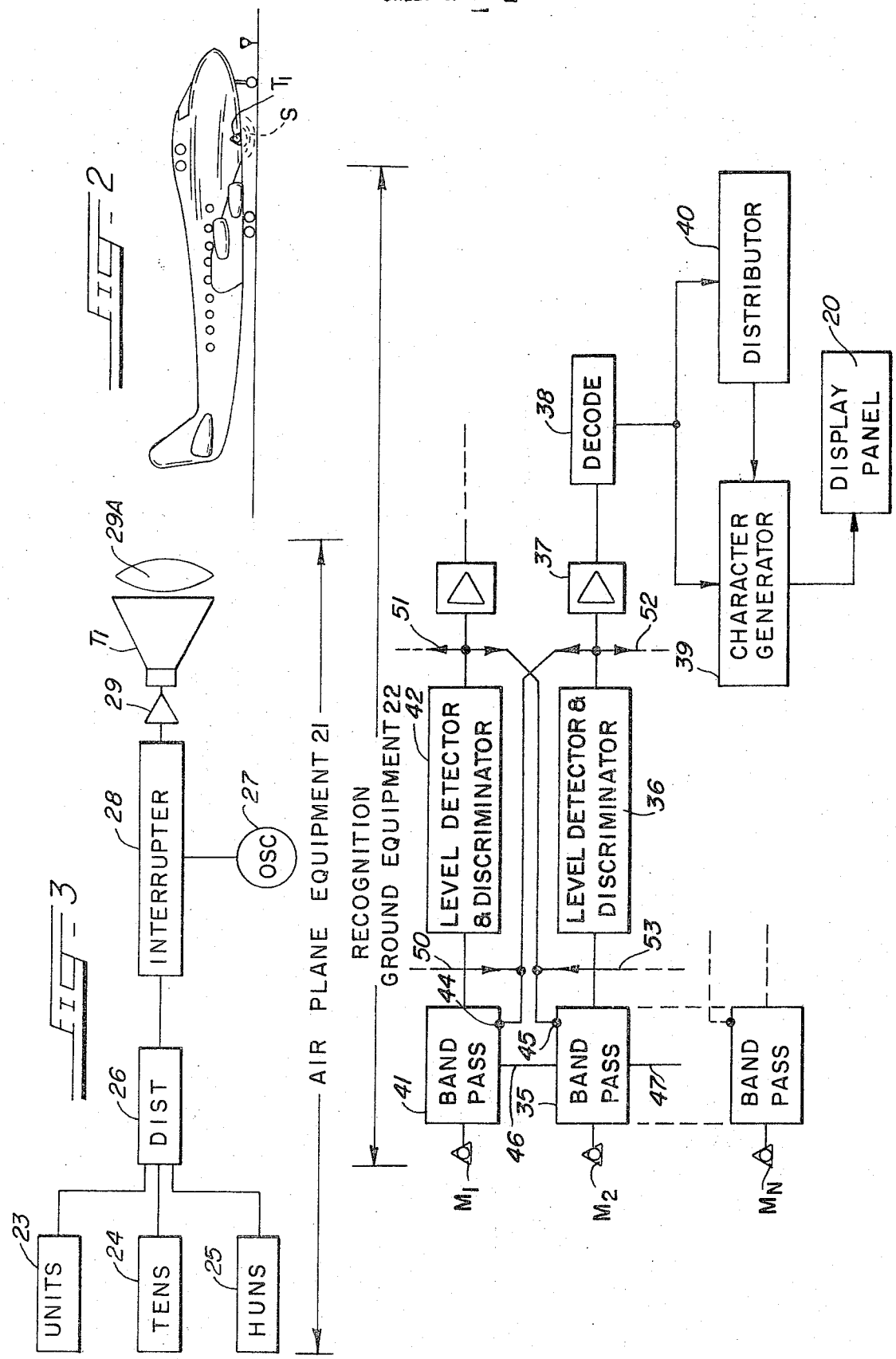

AIRCRAFT GROUND TRAFFIC CONTROL SYSTEM

This invention is related to automatic systems for indicating the positions of airplanes on the ground, at an airport, and more particularly to means for giving air controllers an exact knowledge of the actual location of all planes while on the ground, without regard as to whether they are parked, taxiing, or standing.

Airport traffic is becoming progressively more complex. Many different types of airplanes are mixed on runways, taxi strips, ramps, and other areas. Some planes are behind buildings, some are behind each other. Some are approaching the terminal area, some are leaving the area.

Airport traffic controllers must know where all airplanes are at all times. First, an aircraft on the ground may be a hazard to a landing or taking off airplane. Second, taxiing aircraft may create traffic congestion. Third, ground delays are very expensive to the airlines, annoying to passengers, and may be hazardous by depleting fuel and polluting the atmosphere.

Heretofore, attempts have been made to use proximity sensors to identify and display the location of the airplanes. However, near-by buildings, objects, parked aircraft, and the like reflect the same information and make the system useless. Moreover, the transponders and computers are very expensive. Thus, these systems are impractical.

Accordingly, an object of this invention is to provide a system for continuously monitoring and displaying the exact location of each of a plurality of airplanes while they are on the ground at an airport.

A further object of this invention is to provide an inexpensive means for individually identifying each of a plurality of airplanes and for providing an automatic visual display of the position of each plane location, with respect to the airport ground plan.

In keeping with an aspect of this invention, these and other objects are accomplished by providing each airplane with a sonic transducer, capable of continuously transmitting a uniquely coded sonic signal. Each code identifies the airplane having the transducer associated therewith. On the ground at an airport is a newtwork of separate sonic energy receiving transducers. These transducers are mounted at spaced intervals along the runways, and at other areas of interest on the ground. Each receiver is wired to a display panel having lights located at points corresponding to the specific locations of the actual airport network. Thus, the invention provides for the identification and the continuous display of the exact location of each airplane on the ground at an airport.

These and other objects are accomplished by a preferred embodiment of the invention which may be understood from a study of the following description when taken in conjunction with the accompanying drawings in which:

FIG. 1 shows a schematic representation of a portion of an airport having one embodiment of the invention for automatically indicating the location of each plane that is on the ground;

FIG. 2 schematically shows an airplane mounting the inventive transducer; and

FIG. 3 is a block diagram showing an electronic circuit used in the inventive system to display the airplane location.

In FIG. 1 the reference character 10 identifies a portion of a taxi strip which leads from a terminal gate area 13 to a runway. A hangar area 14 is shown removed from the terminal area. A plurality of airplanes A1-A6 represents various ground traffic conditions. More particularly, the airplane A1 is parked at a gate, ready to load departing passengers. The arriving airplane A2 is fully loaded and approaching a gate. While it is being serviced, airplane A3 is parked in front of a hanger. Airplanes A4, A5, and A6 are in a so-called congo line on a taxi strip leading to the runway. An air traffic controller, located in the tower 18, must keep track of these airplanes and know the general location of each. Thus, FIG. 1 illustrates some of the problems encountered in an attempt to mechanize a display of the location of these planes.

Attempts have been made to use ground based proximity sensors wherein the airplane acts as a passive reflector or interceptor of ground based signals. By way of example, radar beams are reflected and light beams are intercepted. The airplane A3 is parked, out of the ground traffic pattern, and is of no interest to the controller in the tower 18. Reporting its parked location would confuse a controller who is directing the landing airplane A2 since it would appear that airplane A3 has priority in its apparent right to approach a gate. Small airplane A5 is here shown as being positioned in the radar shadow of the two larger airplanes A4, A6.

If an attempt is made to base detection on interception, the same problems exist. Some airplanes are parked and out of service. Some are in shadows of others, and it is not possible to distinguish between them.

If the detector uses a different characteristic, such as a field disturbance or doppler effect, the airplane is reported only under the conditions of those characteristics. Thus, a dopper detector would detect the moving airplane A2 but not the stationary airplane A1. The controller in tower 18 would be likely to direct the airplane A2, to taxi through the space occupied by airplane A1. Likewise, the airplane A5 could be taxiing and the airplane A6 could be stationary. The same is true where the detector depends upon an upset in a balanced field, as where a capacity proximity detector can detect movement until a capacitor is charged or discharged.

As a result of these and other problems, the air traffic controller in tower 18 still depends upon visual contact with the aircraft on the ground. In times of poor visibility this presents problems, and it does not solve the problem of the airplane A1 which is at least partly hidden from view behind terminal 13, or of the small airplane A5 which is hidden among the larger airplanes A6, A4.

According to the invention, each airplane is equipped with a sonic transducer or loudspeaker T1 (FIG. 2) mounted on a convenient part of the airplane, as schematically illustrated. As here shown, the transducer directs its sounds downwardly toward the ground which acts as a diffuser giving the sound an omnidirectional pattern characteristic. However, it is also within the scope of the invention to use a directional horn beaming sound in a specific direction. Each airplane is also equipped with an electronic signal generator which may be selectively coded to provide a different identifying signal for each of the plurality of airplanes. A number of microphones M1 - M16 are located on the ground in known locations near the airplane positions. The acoustic signals radiated from the airplane transducer T1 is limited in range so that it may be picked up only by the closest microphone M1 – M16. Thus, only microphone M1, which is in the closest proximity of airplane A1 will pick up the sound from that airplane. A network of the many microphones are located at relatively close intervals which depend upon the desired resolution. For example, the microphones could be as much as a few hundred feet apart along the edges of the runways and taxiing strips and perhaps much closer at the various terminal gate positions.

Each microphone is connected by a separate cable C1 – C16 to separate electronic processing circuits E1 – E16, which are capable of recognizing the coded signals which may appear in any channel as a result of the proximity of an airplane to a particular microphone, which identifies that particular channel. After passing through the electronic processing circuits E1 – E16, the coded signals activate display indicators D1 – D16 which are arranged on a wall panel 20. This panel has a pictorial map of the airport with the displays at locations corresponding to the actual locations of the associated microphones M1 – M16 placed over the airport ground.

The electronic circuitry is seen in FIG. 3, where the airplane carried equipment is seen at 21 and the ground based recognition equipment is seen at 22. More particularly, the airplane equipment includes hundreds, tens, and units selectors 23, 24, 25 of any suitable design, such as simple rotary switches, for example. These switches feed a suitable distributor 26 which is a switch for placing the hundreds, tens and units digits in proper sequence. Thus, the pilot has only to set the switches 23–25 to his flight number and to turn on the system while on the ground. Actually, there is no reason why the system has to be turned off while it is airborne.

Sonic energy may be provided by any suitable source, such as oscillator 27. Or, the entire sequence could be recorded on a tape recorder and simply played back endlessly. Here, the energy from oscillator 27 is interrupted in a distinctive manner under control of a suitable interrupter 28. A very simple form of coding might be to provide a thousand terminals representing the numbers 000–999 and to cross wire switches 23–25 to make the terminals so that distributor 26 sends three series of pulses to the interrupter 28, each series having the selected number of pulses. However, this simple code would probably be too heavy and expensive to be attractive; therefore, any of the many codes used in aircraft transponders may be used.

In any event a suitably encoded sonic energy signal is amplified at 29 to provide a selectively controlled signal level. Transducer T1 radiates coded, high frequency sonic energy in a desired sound field pattern provided by any suitable device, symbolically shown by the sound lens 29A.

On the ground, each microphone is connected to an associated channel of equipment. Thus, by way of example, microphone M2 is here shown as being connected to band pass filter 35, level detector and discriminator circuit 36, amplifier 37, decoder 38, character generator 39, distributor 40 and panel 20.

The band pass filter 35 rejects all sound except that falling in the narrow band width radiated by the transducer T1. The level discriminator 36 rejects signals passing through band pass filter 35 unless those signals exceed a given signal strength. Thus, the interaction between amplifier 29 and level discriminator 36 is such that the microphone M2 cannot respond if the airplane is more than a predetermined distance away from microphone M2.

If the airplane is between the microphones M1 and M2, the signal out of one of the level discriminators 36, 42 will have greater strength than the signal out of the other.

Each signal is fed back to inhibit the band pass filter of the adjacent channels, as indicated by the heavily inked dots 44, 45. The filters 41, 35 are cross wired at 46, 47 to suitable difference amplifiers so that the filter receiving the stronger signal is enabled and the filter receiving the weaker is inhibited. Thus, if the airplane is closer to microphone M2 than to microphone M1, the filter 35 is enabled, and the filter 41 is inhibited. Similar feedback is provided between all adjacent channels, as indicated by the wires 50–53.

The signal from the enabled channel is amplified at 37 to a standard level required to operate the system. The output of amplifier 37 is fed to a decoder 38 from which a suitable character generator 39 feeds signals to the display panel 20 during time intervals indicated by distributor 40. Therefore, if the pilot operates switches 23–25 to indicate flight number "308," for example, generator 39 causes the character signals "308" to appear in the sequence dictated by distributor 40. These signals are displayed on panel 20 at location D2 (FIG. 1) since the microphone M2 is the effective receptor of the sound. Likewise, airplane A5 might be identified at display D16 as flight 318. The display indicators may be Nixie tubes, light emitting diodes, or any other suitable means for achieving a visual display of the airplane's identification and its location on the ground.

Thus far, the invention has been described as a system for separately identifying a plurality of airplanes and automatically indicating their locations on the ground at an airport. The airplane identification is achieved by coded acoustic signals which are transmitted from a transducer T mounted on the airplane. The location of the airplane is determined from the position of the nearest microphone, among a network of microphones which are installed over the ground area of interest on the airfield. The locations of the various airplanes on the ground are visually displayed on a map of the airport, by lighted airplane identification numbers which appear in positions corresponding to the actual airplane locations on the ground.

However, if the specific identification of each airplane is not required and if only the location of the airplane is desired, the system may be simplified. It is, therefore, possible to eliminate the coded signals and to transmit only a single frequency tone from each of the transducers T. The encoding and decoding portions 23–26, 28, and 38–40 may be eliminated. Only a simple amplification and band pass filtering is needed. In this case, the digital display elements D1 – D16 may also be eliminated and be replaced by simple pilot lights that become illuminated when a microphone channel picks up an acoustic signal from a nearby airplane.

A third system for locating the positions of a plurality of airplanes on the ground is of intermediate complexity. It provides a different frequency signal for each class of airplane, that is to be identified. For example, the small airplane A5 may be one class, the wide body giant airplane A6 may be a second class, and the other airplanes may be a third class.

This third system eliminates the individual coding requirements for making individual plane identifications. It requires only that separate classes of airplanes use different frequency acoustic signals. For example, all large jet aircraft A6 transmit a frequency $f_1$ from their transducers. The smaller jets transmit a frequency $f_2$ from their transducers. Then, the electronic circuits E1 – E16 only separate the two frequencies by suitable filters. Each different frequency signal which appears in a microphone channel lights a pilot light in a distinctive manner on the map. For example, a different color or different flash rate may be used to identify both the type of plane and its location.

While only three specific embodients of this invention have been shown for automatically identifying and locating a plurality of airplanes, it should be understood that various other modifications and alternative constructions may be made. Therefore, the appended claims are intended to cover all equivalent structures that fall within the true spirit and scope of the invention.

I claim:

1. A system for automatically indicating and continuously displaying the locations of individual airplanes while they are on the ground at an airport, said system comprising a transmitting transducer means mounted on each of said airplanes for sensing a coded aircraft identification signal individually associated with each of said airplanes, power activating means for operating said transmitting transducer to send said signal, a plurality of receiving transducer means arranged in a fixed spatial pattern on the airfield, a plurality of communication link means, a plurality of recognition circuit means operated responsive to said identification signal, each of said communication link means connecting a receiving transducer to a corresponding recognition circuit, a plurality of indicator means operated responsive to said identification signals for indicating and continuously displaying both the spatial relationships and the identity of the plurality of receiving transducer means, each of said recognition circuit means being connected to an individually associated indicator means, and means for activating said associated indicator means when the associated receiving transducer is receiving a coded identification signal from an airplane.

2. The system of claim 1 and a display panel comprising a map of the airport area, said indicator means being located on said map at positions corresponding to the physical locations of corresponding ones of said receiving transducer means on said airport.

3. A system for automatically displaying the individual locations of airplanes while they are on the ground at an airport, said system comprising a transmitting transducer means mounted on each of said airplanes for sending an aircraft identification signal individually associated with each of said airplanes, said transmitting transducer being an electroacoustic transducer for radiating an acoustic signal, means for encoding said acoustic signal to identify the airplane carrying the transducer radiating the signal, power activating means for operating said transmitting transducer to send said signal, a plurality of receiving transducer means in fixed spatial relationships on the airfield, a plurality of communication link means, a plurality of recognition circuit means operated responsive to said identification signal, each of said communication link means connecting a receiving transducer to a corresponding recognition circuit, a plurality of indicator means operated responsive to said identification signals for continuously displaying both the spatial relationshps and the identity of the plurality of receiving transducer means, each of said recognition circuit means being connected to an individually associated indicator means, means for activating said aircraft indicator means when the associated receiving transducer is receiving a signal from an airplane, a display panel comprising a map of the airport area, said indicator means being located on said map at positions corresponding to the physical locations of corresponding ones of said receiving transducer means on said airport, each of said indicator means including a visual display, wherein each of said indicators displays a visible legend to identify a particular airplane responsive to the coded message transmitted from the particular airplane which is in close proximity to a receiving transducer channel means individually associated with said indicator to activate the associated recognition circuit and operate the visual indicator, thereby causing the display of the identification legend of the particular airplane, each of said visual legends being located on said map in positions corresponding to the actual positions on the ground of the activated receiving transducer.

4. A system for automatically indicating and continuously displaying the locations of individual airplanes while they are on the ground at an airport, means including an electroacoustic transducer attached to each of said plurality of airplanes, means associated with each electroacoustic transducer for sending a differently encoded acoustic signal corresponding to the identity of the airplane, a plurality of microphone means arranged in a fixed spatial pattern over the airfield, electrical connection means extending between each microphone and a plurality of visual indicators, and means activated by said encoded acoustic signal transmitted from an airplane close to any particular one of said microphones for causing a continuous visual indication of the code associated with the airplane near said particular microphone, thereby displaying the identification of the airplane and also indicating the position of the microphone.

5. The system of claim 4 and a display panel in the form of a map of said airport, said indicators being at locations on said map corresponding to individually associated microphones on said airport.

6. A system for automatically monitoring the locations of a plurality of individually identified airplanes while they are on the ground at an airport, said system comprising a sonic energy transmitting transducer means attached to each of said plurality of airplanes, power activating means for operating said transmitting transducer whereby a sonic energy signal is radiated from said transducer, characterized in that said sonic signal is coded and still further characterized in that each of said plurality of planes has a different coded signal radiated from its transmitting transducer, a plurality of receiving transducer means arranged in a fixed spatial pattern over the airfield, a plurality of communication link means, a link means connecting one of said receiving transducer means to a corresponding one of said recognition circuit means, a plurality of indicator means, said indicator means being arranged in a display pattern corresponding to the spatial pattern occupied by the plurality of receiving transducer means on the airfield, each of said recognition circuit means being connected to an individually associated one of said indicator means which is located in the same corresponding position in the display as the connected receiving transducer means is located in said pattern, means for activating said indicator means by said connected recognition circuit means when said associated receiving transducer means is in such close proximity to an airplane that the radiated sonic energy signal from said airplane is detected thereby, each of said indicator means including a visual display, wherein each of said indicators displays a visible legend to identify a particular airplane responsive to the coded message transmitted from the particular airplane when it is in said close proximity to a receiving transducer means which in turn activates the associated recognition circuit means to operate the visual indicator for causing the display of the identification legend of the particular airplane, said visual legend being located in a position on said display corresponding to the actual position on the ground of the activated receiving transducer means.

* * * * *